United States Patent [19]

Hagedorn et al.

[11] 4,312,661
[45] Jan. 26, 1982

[54] APPARATUS FOR BENDING GLASS SHEETS

[75] Inventors: Floyd T. Hagedorn, Oregon; Robert G. Revells, Toledo, both of Ohio

[73] Assignee: Libbey-Owens-Ford Company, Toledo, Ohio

[21] Appl. No.: 182,019

[22] Filed: Aug. 28, 1980

[51] Int. Cl.³ .......................................... C03B 23/023
[52] U.S. Cl. ...................... 65/290; 65/273; 65/291
[58] Field of Search .............. 65/104, 106, 268, 273, 65/287, 290, 291

[56] References Cited

U.S. PATENT DOCUMENTS 4,203,751  5/1980  Roth et al. ........................... 65/106

FOREIGN PATENT DOCUMENTS 538160   5/1955  Belgium ............................. 65/290
51-1049210 4/1976 Japan .............................. 65/106

*Primary Examiner*—Arthur D. Kellogg
*Attorney, Agent, or Firm*—Collins, Oberlin & Darr

[57] ABSTRACT

An articulated press member having pivotal end sections for imparting complex shapes to glass sheets. The end sections are pivoted in unison by a single fluid cylinder operatively connected to a rack and pinion assembly in turn connected to both end sections for effecting concurrent and equal pivotal movement thereof. A series of adjusting screws are associated with the rack and pinion assembly for angularly adjusting the positions of the end sections in various operative positions of the press member.

8 Claims, 9 Drawing Figures

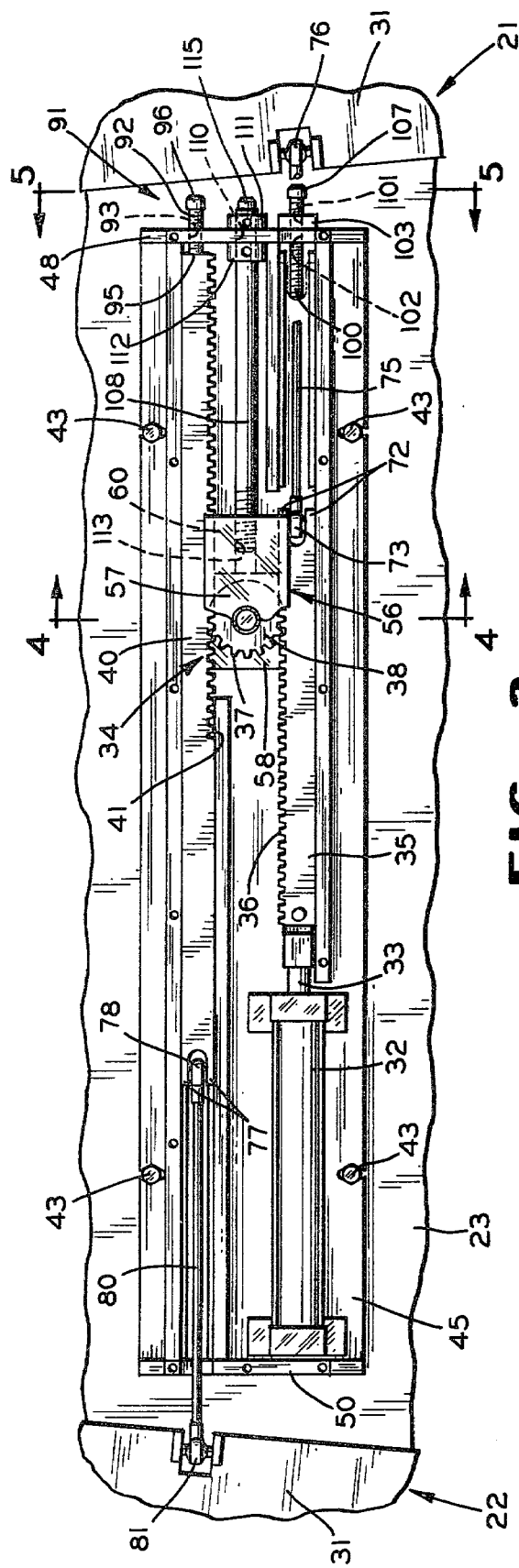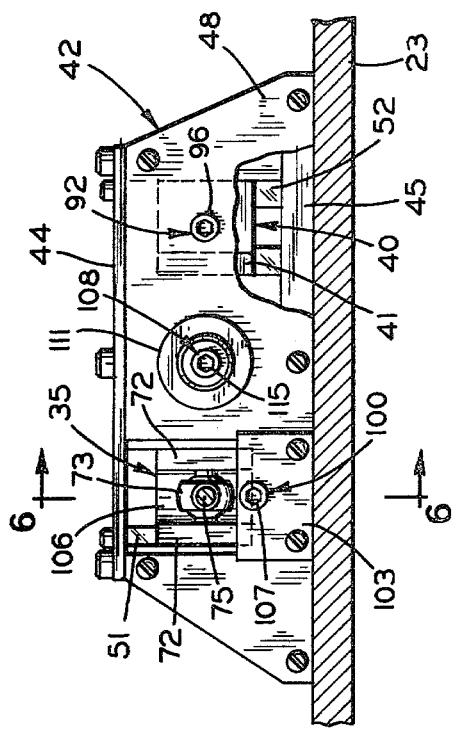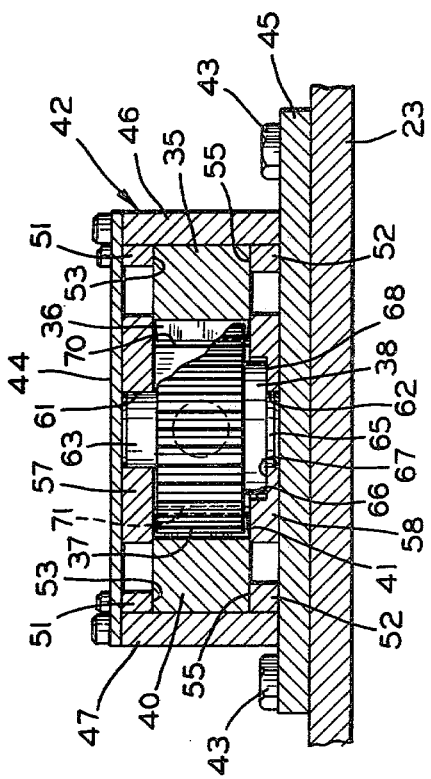

APPARATUS FOR BENDING GLASS SHEETS

BACKGROUND OF THE INVENTION

The present invention relates generally to the production of bent glass sheets and, more particularly, to an articulated press ring having pivotal end sections and which embodies novel means for rapidly adjusting the angular attitude of such pivotal end sections.

Bent sheets of glass are commonly used as glazing closures in vehicles such as automobiles and the like. For such applications, the glass sheets must be bent to precisely defined curvatures and/or sharp bends as dictated by the size and configuration of the glazing openings and the overall styling of the vehicle.

Among the many techniques developed to bend these glass sheets into these increasingly complex shapes, one successful attempt resided in the use of an articulated press ring having a main body section and a pair of pivotal end sections, such as that disclosed and claimed in U.S. Pat. No. 4,074,996, granted on Feb. 21, 1978 and assigned to the same assignee as the present invention. During the glass bending operation, each of the articulated end sections is swung relative to the main body section by a fluid cylinder. Depending on the configuration of the finished shape, it is often necessary to adjust the disposition of the articulated sections in their various operative positions, such as the fully open position, the fully closed position, or to adjust the angular attitude of one section relative to the other. In the first case, this is effected by adjusting the effective length of strokes of the piston rods of both cylinders equally which, from a practical standpoint, is difficult if not impossible to achieve. In the second case, any adjustment of the effective stroke length of one piston rod usually requires a compensating adjustment of the effective stroke length of the other piston rod. In either event, and assuming that both cylinders can be precisely adjusted to the same degree, the response time of the two cylinders in operation is not always synchronous so that one moves prior to the other to adversely affect the final shape of the finished bent product. Also, such adjustments are difficult to make because of the limited access into the press proper due to the many components and parts forming the press apparatus.

SUMMARY OF THE INVENTION

Therefore, it is a primary object of the present invention to obviate the above shortcomings by providing a new and improved articulated press ring having pivotal end sections and embodying novel means for controlling movement of such end sections.

It is another object of this invention to provide the foregoing press ring with means for adjusting the angular attitudes of the articulated end sections thereof smoothly, rapidly and with the consistent precision essential to meet production requirements in a large volume operation.

A further object of the present invention is to provide an articulated press member with a single fluid actuator coupled to a rack and pinion transmission assembly for moving both articulated end sections simultaneously and to equal extents and which is operatively connected to an adjusting assembly for quickly and efficiently adjusting the extent of articulated end section movement.

These and other objects, advantages, and characterizing features of the present invention will become clearly apparent from the ensuing detailed description thereof considered in conjunction with the accompanying drawings, wherein like reference numerals denote like parts throughout the various views.

BRIEF DESCRIPTION OF THE DRAWINGS

FIG. 3 is an enlarged, fragmentary, top plan view of the adjusting assembly associated with the press member of this invention;

FIG. 4 is a vertical sectional view, on an enlarged scale, taken along the line 4—4 of FIG. 3;

FIG. 5 is a side elevational view, on an enlarged scale and partly in section, looking in the direction of arrows 5—5 of FIG. 3;

DESCRIPTION OF THE PREFERRED EMBODIMENT

Figure 1:
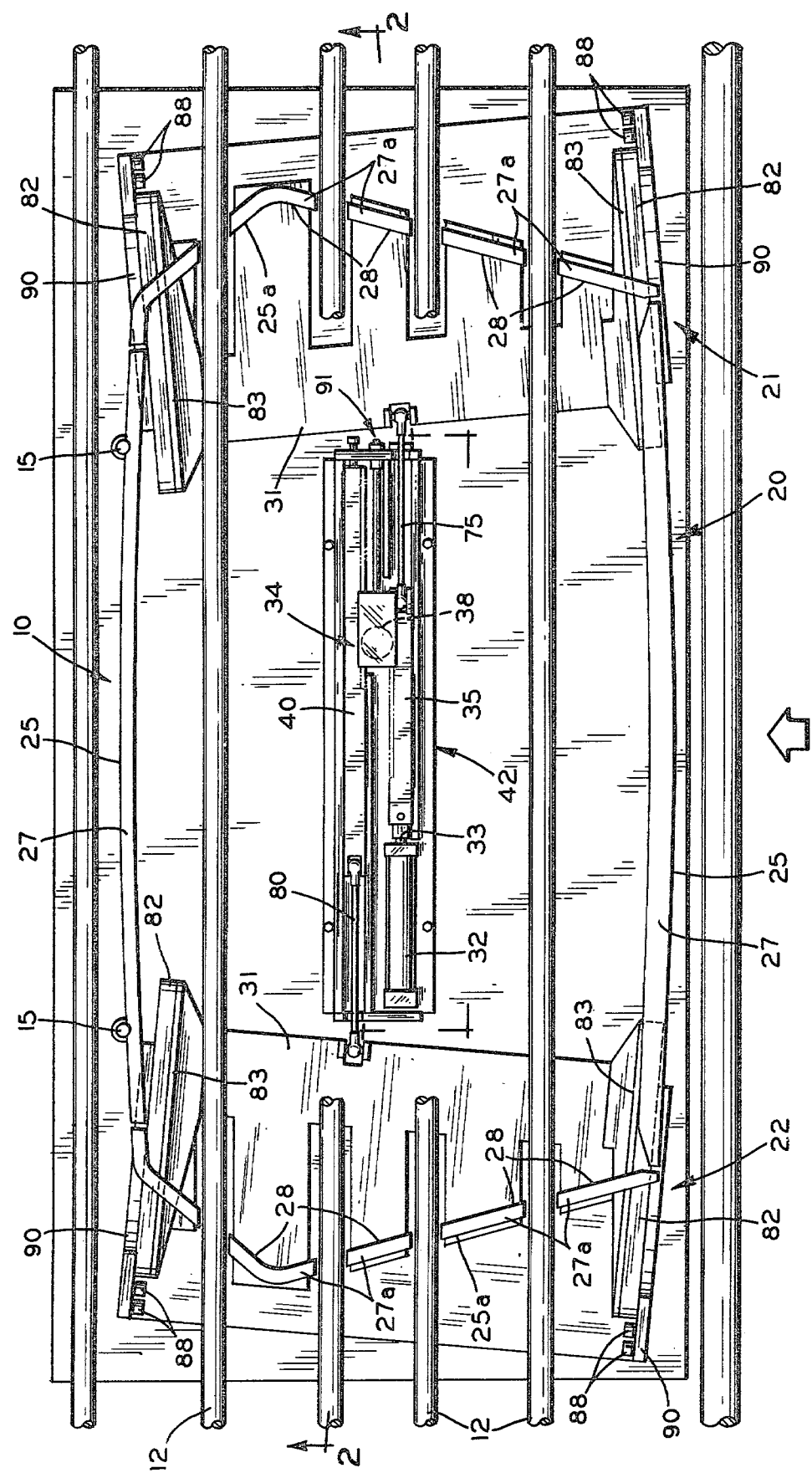
FIG. 1 is a top plan view, with parts broken away, of one form of an articulated press ring member constructed in accordance with this invention.
Figure 2:
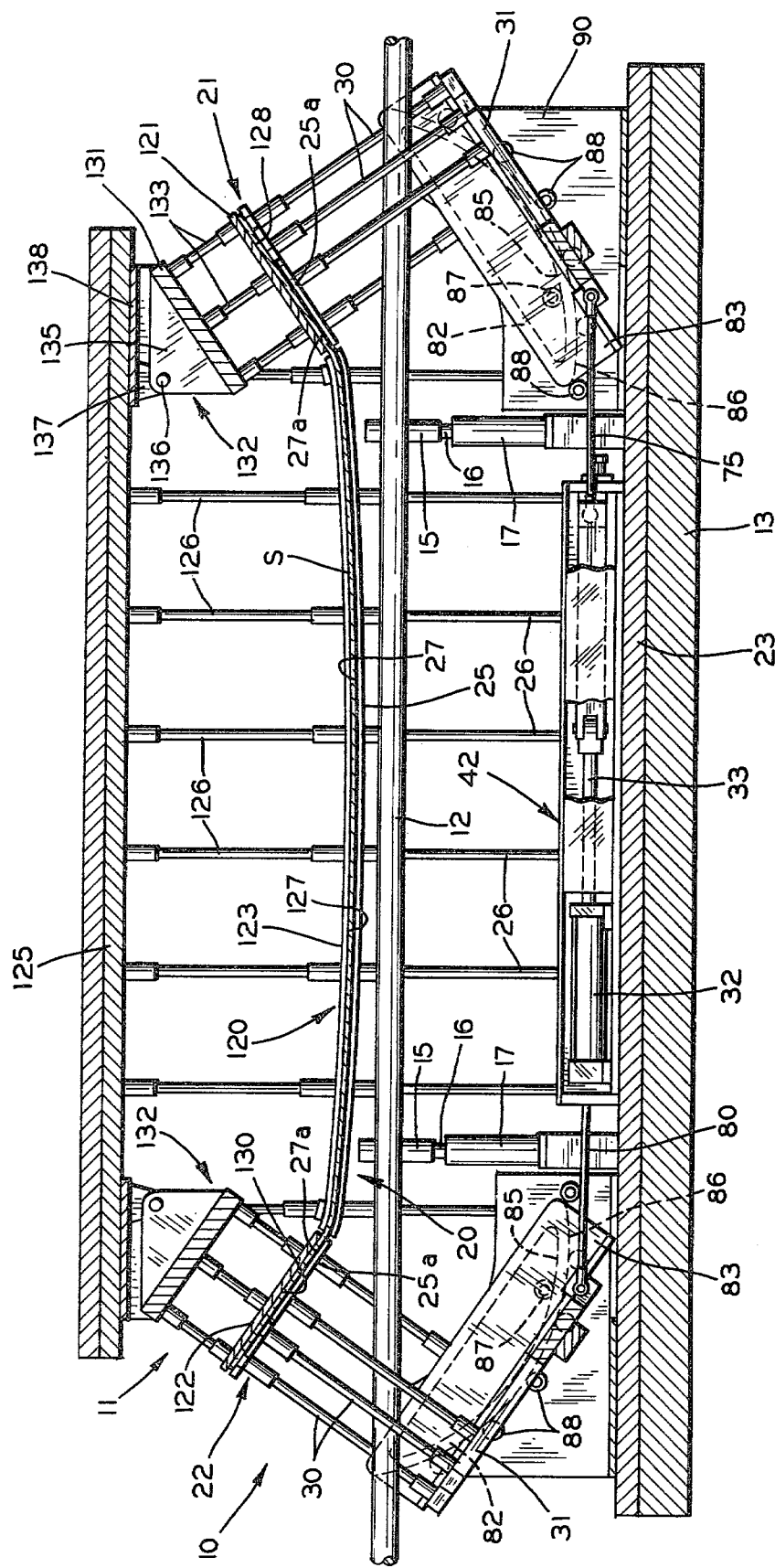
FIG. 2 is a vertical sectional view, taken along the line 2—2 of FIG. 1, showing the upper press member in pressing position with the lower press member.

Referring now in detail to the illustrative embodiment depicted in the accompanying drawings, there is shown in FIG. 1 a press bending member, generally designated 10, embodying the novel features of this invention. The press bending member 10 is of an outline or ring-type construction and constitutes the lower female press member of a bending apparatus which includes an upper male press member 11 (FIG. 2). These press members 10 and 11 have opposed complemental shaping surfaces conforming in curvature to the shape of the glass sheets when bent and which are mounted for relative movement toward and away from each other on a structural framework (not shown).

Also included in the bending area is a series of rotatable conveyor rolls 12 for supporting and advancing a heat-softened glass sheet S into and through the bending area, the rolls 12 forming a part of a conveyor system that carries a flat sheet of glass through a suitable heating furnace prior to entry into the bending area and then conveys the bent sheet of glass out of the bending area and through a chilling area for properly tempering the bent sheet of glass.

The male press member 11 is located above the conveyor rolls 12 while the female press member 10 is located below the conveyor rolls 12 and is mounted on a carriage 13 for vertical reciprocal movement toward and away from the male press member 11. The female press member 10 is segmented, as will hereinafter be more fully described, in order to permit displacement of the lower press member 10 above the level of conveyor rolls 12 for lifting the sheets S thereabove into pressing engagement with the upper press member 11.

At least a pair of laterally spaced locating devices in the form of retractable stop members 15 are positioned in the path of movement of each advancing glass sheet to interrupt movement thereof and accurately position the same in the desired location relative to the press members 10 and 11. Each stop member 15 is secured to the distal end of a piston rod 16 (FIG. 2) of a fluid actuating cylinder 17 mounted on the carriage 13. The cylinders 17 are operative to raise and lower stop members 13 between an upper position above the conveyor rolls 12 in the path of movement of a glass sheet S and a lower position therebeneath.

As shown in FIGS. 1 and 2, the press member 10 comprises a central main body section 20 and a pair of opposite, articulated end sections 21 and 22 mounted for pivotal movement relative to the main body section 20 between a lower glass receiving position and an upper press bending position. The main body section 20 comprises a base plate 23 secured to carriage 13 and a shaping rail 25 connected to the base plate 23 in spaced relation thereto via a series of connecting rods 26. The shaping rail 25 conforms to the width of the glass sheets to be bent and is provided on its upper face with a generally concave shaping surface 27.

The press end sections 21 and 22 are substantially identical and mirror images of each other, and each comprises a shaping rail 25a having an upper shaping surface 27a forming a continuation of the shaping surface 27 of the main body section 20. The shaping rails 25 and 25a together conform in outline to the peripheral outline of the glass sheets to be bent. To permit displacement of the shaping rails 25a above the level of the conveyor rolls 12 for lifting the glass sheets S thereabove in effecting the desired bend, shaping rails 25a are formed of a plurality of segments 28 (FIG. 1) extending generally transversely of conveyor rolls 12 and spaced apart from each other a sufficient distance to pass between adjacent rolls 12 when raised and lowered. The diameter of rolls 12 is relatively small for the purpose of providing maximum clearance therebetween for the passage of segments 28 therethrough. The segments 28 constituting shaping rails 25a are connected via suitable connecting rods to specially configurated, movable base plates 31 and the parts formed thereon, such plates 31 being mounted for swinging movement in arcuate paths relative to the main body section.

It is a feature of this invention that the means for actuating or pivoting base plates 31 and thereby the articulated end sections 21 and 22 employs a single fluid actuating cylinder 32 only. The cylinder 32 is provided with the usual reciprocal piston (not shown) having a piston rod 33 extending axially outwardly therefrom and operatively connected to a mechanical transmission means in the form of a dual rack and pinion assembly, generally designated 34 (FIGS. 1 and 3). The rack and pinion assembly 34 comprises a gear rack 35 suitably rigidly connected to the outer end of piston rod 33. The gear rack 35 is provided with suitable teeth 36 engaging and meshing with the peripheral teeth 37 formed on the cylindrical body of a pinion gear 38. A second gear rack 40, disposed in an opposed, spaced, parallel relation with gear rack 35, is formed with teeth 41 engaging and meshing with the teeth 37 of pinion gear 38.

The entire actuating assembly, including the cylinder 32 and rack and pinion assembly 34, is substantially enclosed within a housing, generally designated 42, suitably mounted on the base plate 23 as by fasteners 43 and comprises a top wall 44, a bottom wall 45, side walls 46 and 47, and end walls 48 and 50, all suitably secured together to form a rectangular, box-like structure. The side walls 46 and 47 serve as guide plates confining the gear racks 35 and 40, respectively, within the housing 42 and guiding the same in parallel, rectilinear paths of movement. Also, upper and lower elongated guide members 51 and 52 having opposed bearing surfaces 53 and 55, respectively, facilitate sliding movement of their associated gear racks while maintaining the latter at the desired elevation in registry with the teeth of pinion gear 38. These members 51 and 52 form with the side walls 46 and 47 channels for guiding the gear racks 35 and 40 in their desired reciprocal, axial paths of movement.

The pinion gear 38 is mounted and journalled for rotation within a block 56 encased within the housing 42. The block 56 comprises an upper wall 57, a lower wall 58, and an end wall 60 of substantial thickness. The upper and lower walls 57 and 58 are formed with aligned bores 61 and 62 for receiving the axially projecting stub shafts 63 and 65 of the pinion gear 38. The lower wall 58 is counterbored as at 66 to define a bearing surface 67 for the annular bottom face 68 of the pinion gear body. The block 56 is formed with recessed guideways 70 and 71 along the opposite sides thereof for accommodating the teeth 36 and 41 of the gear racks 35 and 40, respectively.

The distal end of gear rack 35 is formed with bifurcations 72 between which is mounted a universal joint 73 for connecting the gear rack 35 to a connecting rod 75. The connecting rod 75, in turn, is connected by means of a universal joint 76 to the pivotal base plate 31 of end section 21. In a similar, but opposite arrangement, one end of gear rack 40, i.e. the end of rack 40 appearing towards the left as viewed in FIG. 3, is formed with bifurcations 77 for receiving a universal joint 78 connecting the rack 40 to a connecting rod 80, in turn connected by a universal joint 81 to the opposite pivotal base plate 31 of end section 22.

Means are provided for guiding the plates 31 and thereby press end sections 21 and 22 in their arcuate movements, such guide means comprising a cam track 82 rigidly secured to an upright bracket 83 affixed to each side of each base plate 31. As best shown in FIG. 2, each cam track 82 is formed with an inner arcuate cam surface 85 and an outer arcuate cam surface 86 adapted to ride on an inner roller 87 and a series of outer rollers 88, respectively, journalled for rotation in an upright mounting plate 90 located adjacent to and outwardly of the associated bracket 83.

It should be appreciated that many adjustments of the press end sections are required, especially during experimental runs in forming a new glazing closure of precisely defined curvature and, even thereafter, during commercial production runs of such glazing closures. These adjustments are necessary in order to establish and preserve the fully open and fully closed positions of the end sections 21 and 22 for properly receiving the flat glass sheets and then bending the same into their desired finished configurations within the close tolerances prescribed by automotive requirements. In conventional apparatus wherein the two articulated end sections are moved by two actuators, respectively, identical adjustments of both are required. This is difficult to achieve and is usually accomplished by trial and error, involving time-consuming labor as well as lengthly interruptions in the trial or production runs. Moreover, once the adjustments are finalized, the lag in response time of one actuator relative to the other during the operation thereof sometimes adversely affects the final shape imparted to the sheet, compounding the problem of maintaining the close tolerances required for proper automotive fit.

The present invention addresses these problems by employing only a single fluid cylinder 32 coupled to a power transmittion system in the form of the dual rack and pinion assembly 34 for actuating both articulated end sections 21 and 22 simultaneously and to the same extent and by providing an adjusting assembly, generally designated 91, operatively associated with such rack and pinion assembly 34 to make any necessary end section adjustments rapidly and smoothly within a minimum of time.

Figure 7:
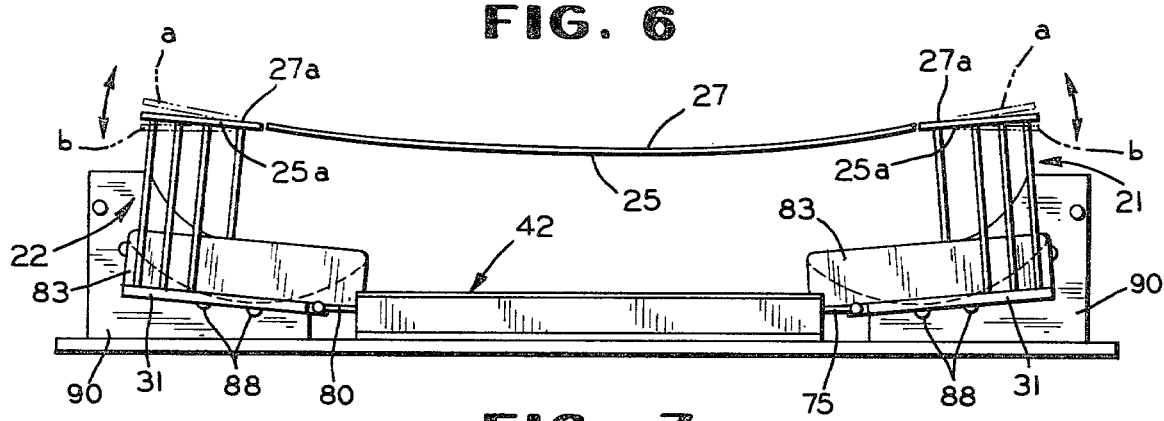
FIGS. 7, 8 and 9 are schematic front elevational views, showing the various adjustments made to alter the relative positions of the articulated press end sections in accordance with this invention.

The adjusting assembly 91 comprises a first adjusting screw 92 effective to change the angular attitudes of both articulated end sections 21 and 22 relative to the main body section 20 in the "open" position of the press member 10. This "open" position is shown in FIG. 7 and defines the position of the end sections 21 and 22 preparatory to receiving the flat glass sheet to be bent. The screw 92 (FIG. 3) is threaded through a tapped opening 93 formed in end wall 48 and has a distal end 95 abutting the free end of gear rack 40. The other end of screw 92 is formed with a flat-sided head 96 adapted to receive a complementary shaped socket of an appropriate tool to facilitate turning of the screw. Assuming, for the time being, that there are no stops or other impediments in the path of movement of gear rack 35, it can be seen that threading screw 92 inwardly shifts the gear rack 40 toward the left as viewed in FIG. 3 to raise, via connecting rod 80, the movable plate 31 and thereby end section 22 to elevate the associated shaping rail 25a to any selective upper position, such as shown in phantom at "a" in FIG. 7. Simultaneously, such leftward shifting of gear rack 40 turns the pinion gear 38 counterclockwise to, in turn, shift the gear rack 35 to the right and effect raising of the other end section 21 and the associated shaping rail 25a an equal amount. When desired or necessary to lower the shaping rails 25a of end sections 21 and 22 relative to the main body section 20 in the open position of the press member 10, screw 92 is threaded outwardly so that upon subsequent operation of cylinder 32 in retracting the piston rod 33, the above rack and pinion movements will be reversed to dispose the end sections 21 and 22 and thereby their associated shaping rails 25a in the selective lower positions, such as shown in phantom at "b" in FIG. 7. The screw 92 serves as a stop limiting or determining the position of the press end sections 21 and 22 and thereby the shaping surfaces 27a thereof, respectively, when in their open position preparatory to receiving the glass sheet to be bent.

Figure 6:
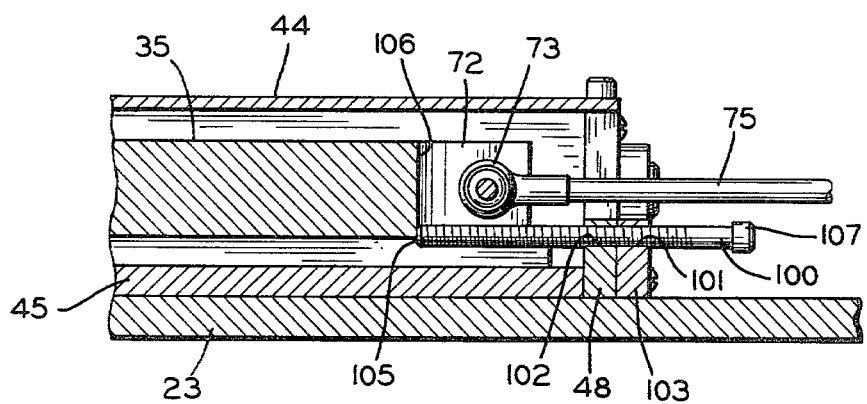
FIG. 6 is a fragmentary, vertical sectional view, taken along the line 6—6 of FIG. 5.
Figure 9:
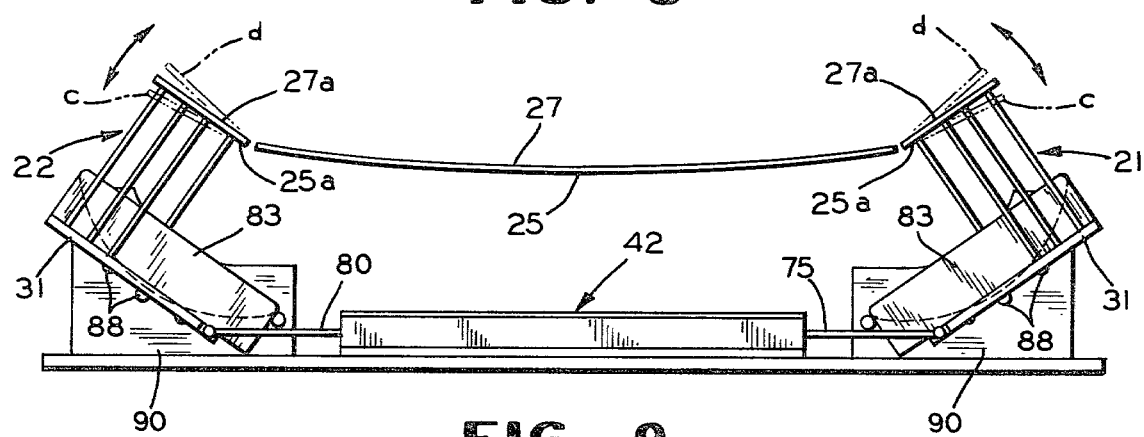

The adjusting assembly 91 also comprises a second adjusting screw 100 operative to change the angular attitude of the end sections 21 and 22 and thereby shaping rails 25a relative to shaping rail 25 of the main body section 20 in the "closed" position of the press member 10. This "closed" position is shown in FIG. 9 and defines the upper positions of the shaping rail surfaces 27a of end sections 21 and 22, respectively, to complete the final bend of the glass sheet. The screw 100 is threaded through aligned tapped openings 101 and 102 formed in a block 103 and the housing end wall 48, respectively, and has a distal end 105 (FIG. 6) extending between the bifurcations 72 of gear rack 35 and abutting against an end face 106 formed therebetween. The other end of screw 100 is provided with a flat-sided head 107 for receiving a suitable tool to facilitate turning of the screw 100. With the press end sections 21 and 22 in the closed position and screw 92 backed off away from rack 40, turning of the screw 100 inwardly shifts the gear rack 35 toward the left as viewed in FIG. 3 to lower, via connecting rod 75, the movable plate 31 and thereby the shaping rail 25a of end section 21 to a selective lower position as shown in phantom at "c" in FIG. 9. Simultaneously, the shaping rail 25a of the other end section 22 will be lowered an equal extent via clockwise movement of pinion gear 38 and linear movement of gear rack 40 in the opposite direction or towards the right as viewed in FIG. 3. In order to raise the shaping rails 25a of end sections 21 and 22 an equal amount, the screw 100 is threaded outwardly to reverse the above gear rack and pinion gear movements so that subsequent operation of cylinder 32 in extending the piston rod 33 will dispose the shaping rails 25a of end sections 21 and 22 in the selective raised positions as shown at "d" in FIG. 9 to effect a more pronounced or deeper bend. Screw 100 serves as a stop to determine the fully closed positions of the shaping rail surfaces 27a of press end sections 21 and 22 and thereby the final shape imparted to the glass sheet.

Figure 8:
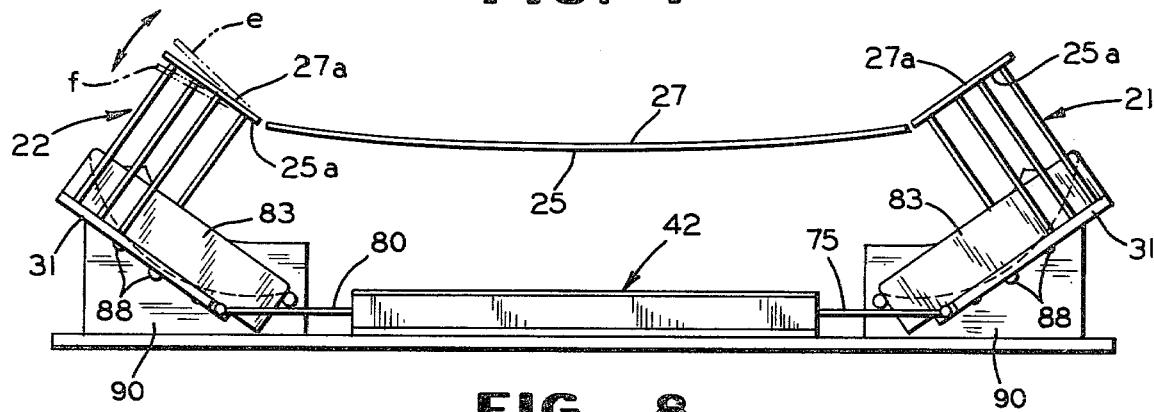

As described above, the screws 92 and 100 are employed to effect equal adjustments in the same directions of the shaping rail surfaces 27a of end sections 21 and 22 in the open and closed positions, respectively, of the press member 10. Sometimes, however, it is desired and necessary to adjust only one of the end sections. To this end, the adjusting assembly 91 further includes a third adjusting screw 108 extending through an opening 110 in end wall 48 and suitable aligned openings formed in collars 111 and 112 disposed on opposite sides of the end wall 48. The distal end of the screw 108 is threaded into a tapped bore 113 formed in the thick end wall 60 of block 56. Similarly to the others, adjusting screw 108 is formed with a flat-sided head 115 for receiving the socket of a suitable tool facilitating the turning of screw 108. Since the screw 108 is fixed against axial movement, rotation thereof will effect axial movement of the block 56 and the pinion gear 38 encased therein. With the shaping rails 25a of end sections 21 and 22 in their closed positions and with gear rack 35 fixed against movement between the extended pressurized cylinder 32 and adjusting screw 100, turning the screw in a counterclockwise direction will move the block 56, as well as pinion gear 38, leftwardly as viewed in FIG. 3, causing the pinion gear 38 to rotate counterclockwise and shift gear rack 40 leftwardly to raise movable plate 31 and thereby the shaping rail 25a of end section 22 to the desired selective attitude shown in phantom at "e" in FIG. 8. To lower end section 22, such as indicated at "f" in FIG. 8, screw 108 is rotated clockwise to reverse the above-described operation. However, adjusting screw 92 must first be backed off away from gear rack 40 to permit movement thereof to the right as viewed in FIG. 3.

When desired to reposition only the shaping rail 25a of end section 21 and with the end sections 21 and 22 in their closed positions, both shaping rails 25a of the sections 21 and 22 are adjusted to the desired extent by manipulating adjusting screw 100 in the manner described above. Then the shaping rail 25a of section 22 can be returned to its original position by turning adjusting screw 108 in the appropriate direction, as also explained above. This results in positioning the shaping rail 25a of end section 21 to the desired attitude relative to the main body section 20 and the shaping rail 25a of the other end section 22.

The upper press member 11 (FIG. 2) comprises a central main body section 120 and a pair of supplemental shaping elements 121 and 122 located at the opposite ends of the main body section 120. The main body section is of outline or ring-type construction and comprises a shaping rail 123 connected to a base plate 125 in spaced relation thereto by a series of connecting rods 126. The shaping rail 123 conforms to the width of the glass sheets to be bent and is provided with a downwardly directed, generally convex shaping surface 127 complementary to the shaping surface 27 of the lower press member's main body section 20.

The shaping elements 121 and 122 have outline configurations conforming to the end portion of the sheets to be bent and continuous shaping surfaces 128 and 130 complementary to the shaping surfaces 27a of the articulated end sections 21 and 22. Each shaping element 121,122 is suspended from a plate 131 of a support bracket 132 by a series of threaded connecting rods 133. The bracket 132 also includes an upright plate 135 pivotably mounted, as by a pin 136, to a lug 137 depending from a horizontal plate 138 rigidly secured to the base plate 125 of the upper press member 11. The adjustability of the threaded connecting rods 133, as well as the angular disposition of the shaping elements 121,122, enable the latter to be adjusted in conformity with the selected angular attitudes of the shaping rails 25a of end sections 21 and 22 of the lower press member 10 to impart the desired shape to the glass sheet end portions pressed therebetween.

From the foregoing, it is apparent that the objects of the present invention have been fully accomplished. As a result of this invention, the shaping surfaces of the pivotal end sections of an articulated press member can be equally angularly adjusted to the same extent in both the open and closed position or each of the shaping surfaces of either end section can be individually angularly adjusted relative to the other, as desired. These several adjustments offer versatility in shaping glass sheets to precise, complex configurations. Moreover, all these adjustments can be readily performed by an attendant located at one side only of the press member and, utilizing the appropriate socket extension, outwardly of the press member without encumbrance by the components and the hardware forming a part of the press member.

It is to be understood that the form of the invention herewith shown and described is to be taken as an illustrative embodiment only of the same, and that various changes in the shape, size and arrangement of parts, may be resorted to without departing from the spirit of the invention.

We claim:

1. Apparatus for bending glass sheets comprising: a frame, a press member mounted on said frame and having a shaping surface thereon for supporting a heat-softened sheet of glass, said press member having a main body section and a pair of opposite articulated end sections mounted for pivotal movement relative to said main body section, means for moving said articulated end sections simultaneously relative to said main body section, said moving means including a fluid actuating cylinder having an axially movable piston provided with a piston rod, a first gear rack connected at the opposite ends thereof to said piston rod and one of said end sections, respectively, a second gear rack connected to said other end section, and a pinion gear interposed between and meshing with both of said gear racks.

2. Apparatus according to claim 1, including means associated with said gear racks for selectively adjusting the disposition of said articulated end sections relative to said main body section at various operative positions of said press member.

3. Apparatus according to claim 1, including means for selectively adjusting the length of travel of said gear racks, respectively, and thereby the disposition of said articulated end sections.

4. Apparatus according to claim 3, wherein said adjusting means comprises a pair of screws engageable with end portions of said gear racks, respectively, for limiting the axial movement thereof.

5. Apparatus according to claim 1, including means for selectively adjusting the disposition of one of said articulated end sections relative to the other of said articulated end sections.

6. Apparatus according to claim 5, wherein said adjusting means comprises a block encasing said pinion gear and a screw threaded into said block for moving said block and thereby said pinion gear axially of said screw.

7. Apparatus according to claim 4, including second means for adjusting the disposition of one of said articulated end sections relative to the other of said articulated end sections, said second adjusting means comprising a block encasing said pinion gear and a third screw threaded into said block for moving said block and thereby said pinion gear axially of said third screw.

8. Apparatus according to claim 7, wherein said screws are formed with flat-sided heads located on one side of said press member for receiving complementary shaped tools facilitating rotation of said screws, respectively.

* * * * *